(12) United States Patent
Li et al.

(10) Patent No.: US 10,381,907 B2
(45) Date of Patent: Aug. 13, 2019

(54) PUMP AND ELECTRIC MOTOR

(71) Applicant: Johnson Electric S.A., Murten (CH)

(72) Inventors: Min Li, Shenzhen (CN); Zhi Ping Fu, Shen Zhen (CN); Moola Mallikarjuna Reddy, Shen Zhen (CN); Kok Ang Chong, Hong Kong (CN)

(73) Assignee: JOHNSON ELECTRIC INTERNATIONAL AG, Murten (CH)

(*) Notice: Subject to any disclaimer, the term of this patent is extended or adjusted under 35 U.S.C. 154(b) by 194 days.

(21) Appl. No.: 15/251,291

(22) Filed: Aug. 30, 2016

(65) Prior Publication Data

US 2017/0063210 A1 Mar. 2, 2017

(30) Foreign Application Priority Data

Aug. 31, 2015 (CN) .......................... 2015 1 0548299

(51) Int. Cl.
| | |
|---|---|
| *H02K 13/06* | (2006.01) |
| *H02K 21/12* | (2006.01) |
| *F04D 13/06* | (2006.01) |
| *H02K 5/128* | (2006.01) |
| *F04D 29/22* | (2006.01) |
| *H02K 1/14* | (2006.01) |
| *H02K 1/27* | (2006.01) |
| *H02K 21/18* | (2006.01) |

(52) U.S. Cl.
CPC ............. *H02K 21/12* (2013.01); *F04D 13/06* (2013.01); *F04D 29/22* (2013.01); *H02K 1/14* (2013.01); *H02K 1/2706* (2013.01); *H02K 5/128* (2013.01); *H02K 21/185* (2013.01)

(58) Field of Classification Search
CPC ............................... H02K 21/14; H02K 21/12
USPC ............................................................ 310/152
See application file for complete search history.

(56) References Cited

U.S. PATENT DOCUMENTS

| 4,750,872 A * | 6/1988 | Palliser ................. F04D 13/021 |
| | | 416/244 R |
| 9,551,343 B2 * | 1/2017 | Marks ................... A01K 63/047 |
| 2005/0111992 A1 * | 5/2005 | Iacocca ................. F04D 13/022 |
| | | 417/313 |
| 2006/0226715 A1 * | 10/2006 | Lee ......................... H02K 29/03 |
| | | 310/156.46 |
| 2015/0061437 A1 * | 3/2015 | Hudec .................... H02K 5/128 |
| | | 310/86 |

FOREIGN PATENT DOCUMENTS

| DE | 102011014088 A1 | 9/2012 |
| EP | 0001334 A1 | 4/1979 |

* cited by examiner

*Primary Examiner* — Terrance L Kenerly
(74) *Attorney, Agent, or Firm* — Muncy, Geissler, Olds & Lowe, P.C.

(57) ABSTRACT

A motor (10) and a pump having the motor are provided. The motor (10) includes a stator (14) and a rotor (16) rotatable relative to the stator (14). At least one of the stator (14) and the rotor (16) has a magnetic core (20) and a winding (22) wound around the magnetic core (20). The magnetic core is mounted to a base body (18). The base body (18) has at least one recess (54) for receiving debris produced by mutual friction between the magnetic core (20) and the base body (18).

11 Claims, 9 Drawing Sheets

US 10,381,907 B2

PUMP AND ELECTRIC MOTOR

CROSS REFERENCE TO RELATED APPLICATIONS

This non-provisional patent application claims priority under 35 U.S.C. § 119(a) from Patent Application No. CN201510548299.9 filed in The People's Republic of China on Aug. 31, 2015.

FIELD OF THE INVENTION

The present disclosure relates to electric motor.

BACKGROUND OF THE INVENTION

In home appliances such as washing machines or dish washers, liquid pumps are used to pressurize and deliver water so as to introduce clean water into the appliances for cleaning clothes or dishes, and finally discharge the waste water out of the appliances.

The existing liquid pumps usually use a single phase permanent magnet motor to drive an impeller to rotate. The motor has an stator core and a permanent magnet rotor rotatably disposed in the stator core. The stator core is wound with windings. The windings are connected to a driving circuit. Upon energization of the windings, the stator core is polarized which interacts with permanent magnet rotor to drive the rotor to rotate. The impeller is connected to the rotor for synchronous rotation with the rotor to drive the water to flow. stator core In a conventional design, a rotor housing is disposed between the rotor and the stator core. However, when the stator core is assembled to the rotor housing, the stator core may scratch the rotor housing to produce debris. If the debris is clamped between the stator core and the rotor housing, the stator core cannot be assembled in place, which makes the axes of the stator and rotor offset from each other, thereby causing unsmooth rotation of the rotor and large noise.

SUMMARY OF THE INVENTION

According to one aspect of the present disclosure, a motor includes a stator and a rotor rotatable relative to the stator. At least one of the stator and the rotor includes a magnetic core and a winding wound around the magnetic core. The magnetic core is mounted to a base body. The base body has at least one recess for receiving debris produced by mutual friction between the magnetic core and the base body.

Preferably, the base body is disposed between the stator and the rotor in a radial direction.

Preferably, the base body has a step with an axial end surface for positioning the magnetic core, and the recess and the magnetic core are disposed at two sides of the axial end surface.

Preferably, the base body has an axially-extending rib for guiding relative movement between the magnetic core and the base body, the rib intersects with an axial end surface of a step of the base body, and the base body has two recesses disposed at two circumferential sides of the rib respectively.

Preferably, the rib extends to the step and the two recesses are defined by the rib and the step.

Preferably, the base body has a sleeve receiving the rotor, the stator has a stator core which has a pair of pole shoes, and inner wall surfaces of the pair of pole shoes are recessed to form pole arc surfaces surrounding the sleeve.

Preferably, the pole arc surfaces of the pole shoes lay on an outer wall surface of the sleeve, and the sleeve has an axially-extending rib which is inserted into a slot between pole tips of the pole shoes.

Preferably, a step is projected from an outer wall surface of the sleeve and defines recesses at two circumferential sides of the rib.

Preferably, the pole arc surfaces have a diameter greater than an outer diameter of the sleeve, the pole arc surfaces and an outer wall surface of the sleeve are radially spaced apart, and the sleeve has at least one axially-extending rib contacting the pole arc surfaces.

Preferably, the sleeve has a plurality of ribs which are evenly spaced along a circumferential direction.

Preferably, the pole arc surface is formed with a startup groove.

Preferably, a slot is formed between pole tips of the pair of pole shoes, an air gap is formed between the outer wall surface of the rotor and the pole arc surfaces of the stator, and a ratio of a width of the slot to a width of the air gap is greater than zero and less than two.

Preferably, a slot is formed between distal ends of the pair of pole shoes, an axially-extending end surface of pole tip of each pole shoe and the pole arc surface intersect to form a sharp angle.

Preferably, the axially-extending end surface of the pole tip of each pole shoe and the pole arc surface perpendicularly intersect with each other.

Preferably, the motor is a single phase synchronous motor, and the rotor of the motor is a permanent magnet motor.

According to another aspect of the present disclosure, a pump includes above described motor and an impeller couple to the rotor of the motor.

DETAILED DESCRIPTION OF THE PREFERRED EMBODIMENTS

Figure 1:
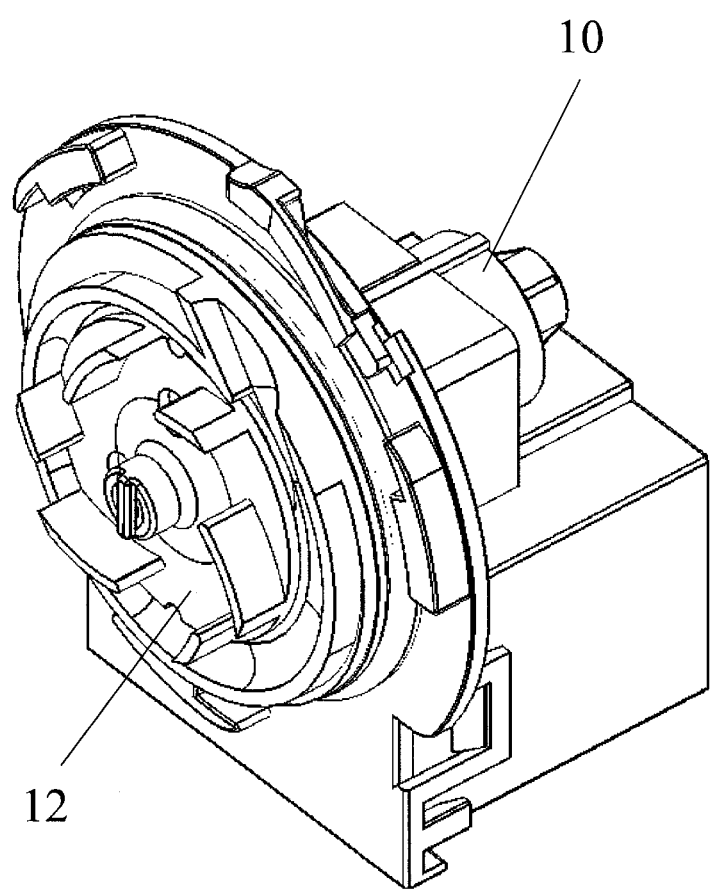
FIG. 1 illustrates a liquid pump according to one embodiment of the present disclosure.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

Figure 2:
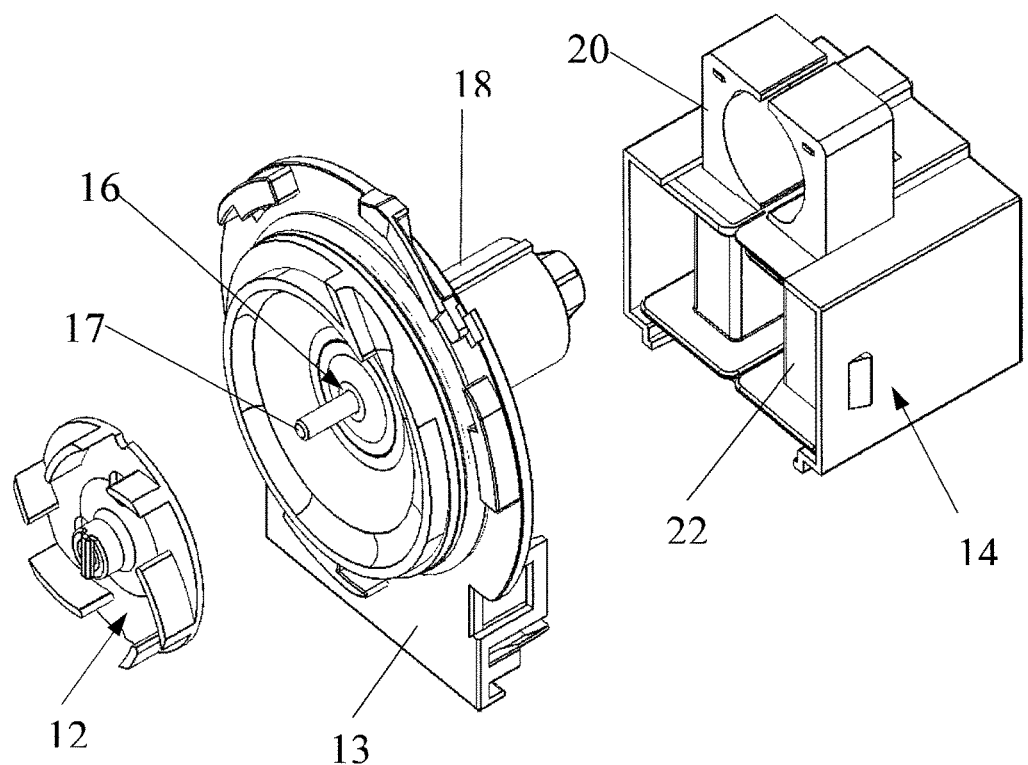
FIG. 2 is an exploded view of FIG. 1.
Figure 3:
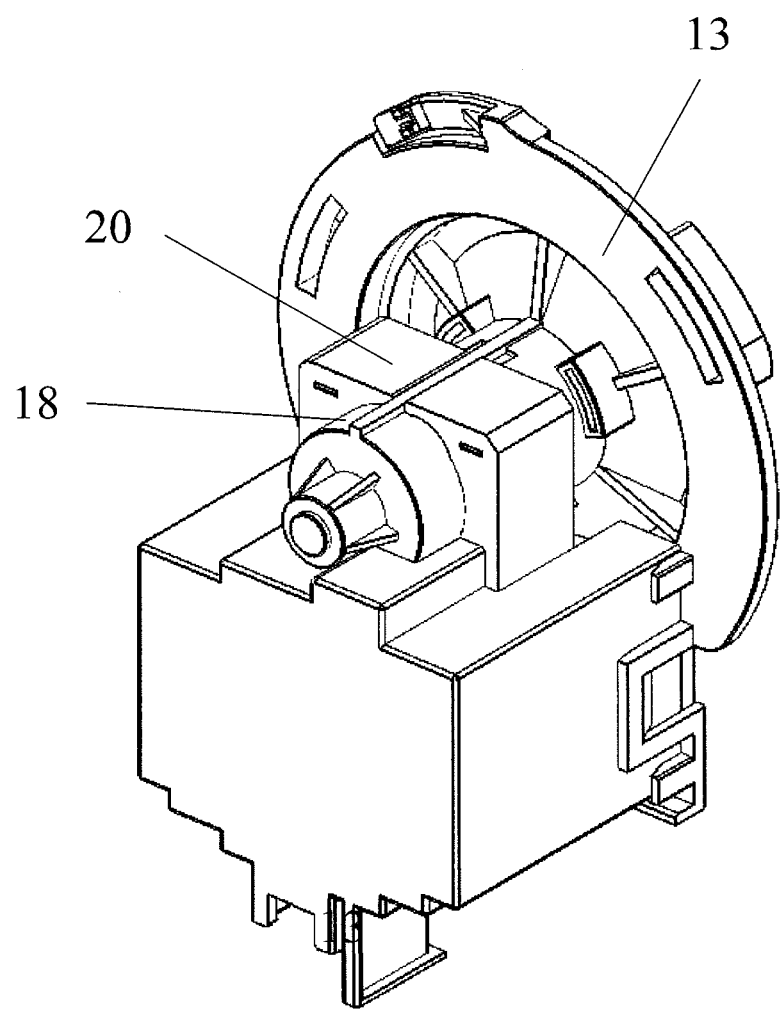
FIG. 3 illustrates the liquid pump of FIG. 1, viewed from another aspect.

Referring to FIG. 1 to FIG. 3, a pump in accordance with one embodiment of the present disclosure includes a motor 10 and an impeller 12 driven by the motor 10. The motor 10 is preferably a single phase permanent magnet motor which includes a stator 14, a rotor 16, and a rotor housing (which may also be referred to as a base body) 18. The base body has a sleeve disposed between the rotor 16 and the stator 14. The stator 14 includes a magnetic core 20, windings 22 wound around the magnetic core 20, an a circuit board connected with the windings 22. Preferably, the magnetic core 20 is a U-shaped stator core. The rotor 16 is a permanent magnet rotor. Each of the magnetic core 20 and the rotor 12 forms a pair of magnetic poles, and the poles of the magnetic core 20 and the rotor 16 interact with each other to drive the rotor 16 to rotate. The impeller 12 is coupled to a shaft 17 of the rotor 16 for synchronous rotation with the rotor 16 to drive liquid such as water to flow.

Figure 4:
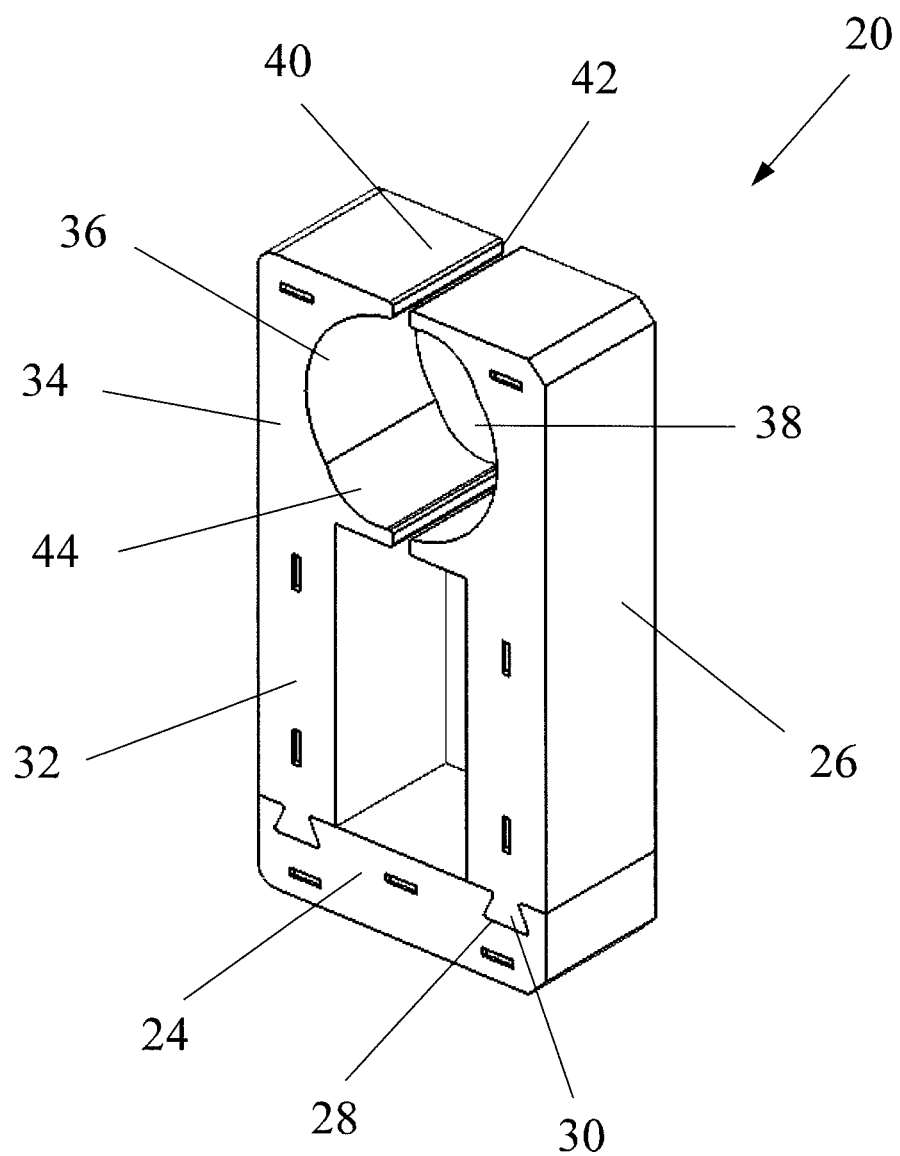
FIG. 4 is a perspective view of a magnetic core of the liquid pump of FIG. 3.

Referring to FIG. 4, the magnetic core 20 includes an end portion 24 and two pole arms 26 vertically extending from the end portion 24. In this embodiment, the end portion 24 and the pole arms 26 are each formed by stacking a plurality of laminations such as silicon steel sheets and are mechanically connected to each other. The end portion 24 and the pole arms 26 are connected with a dovetail joint which prevents the end portion 24 and the pole aims 26 from disconnection from each other. In this embodiment, the end portion 24 forms engagement grooves 28 at opposite sides thereof, respectively. The two pole arms 26 form corresponding engagement protrusions 30 engaged in the engagement grooves 28, respectively. In another embodiment, the engagement grooves may alternatively be formed in the pole arms 26, the engagement protrusions 30 are accordingly formed on the end portion 24, and the magnetic core 20 is likewise formed by a mortise joint. In this embodiment, the end portion 24 and the pole aims 26 are separately formed and then mechanically connected, which facilitates the winding process of the windings 22. In some embodiments, the magnetic core 20 may alternatively be a monolithic structure.

The two pole arms 26 of the magnetic core 20 have substantially the same construction and are spacingly disposed in parallel with each other. Each pole arm 26 is elongated, including a connecting arm 32 and a pole shoe 34 formed at a distal end of the connecting arm 32. The two connecting arms 32 are spacingly disposed in parallel with each other. One engagement protrusion 30 protrudes outwardly from an end surface of each connecting arm 32 that faces toward the end portion 24, which is engaged in one corresponding engagement groove 28. In this embodiment, the windings 22 are wound around the connecting arms 32 and are connected in series. The two pole shoes 34 are disposed away from the end portion 24 and act as a pair of magnetic poles of the magnetic core 20 of the stator 14. Upon energization of the windings 22, the pole shoes 34 are polarized to have opposite polarities. The two pole shoes 34 are opposed to and spaced apart from each other. Inner wall surfaces of the pole shoes 34 are recessed inwardly such that a space 38 for receiving the rotor 16 is formed between the two pole shoes 34. The inner wall surfaces of the two pole shoes 34 form pole arc surfaces 36 surrounding the space 38. The space 38 is cylindrical, and the pole arc surfaces 36 are substantially cylindrical surfaces, confronting the outer wall surface of the rotor 12 in a radial direction.

In this embodiment, each pole shoe 34 is substantially C-shaped, two circumferential ends of which extend laterally from the connecting arm 32 to form two pole tips 40. The pole tips 40 are substantially parallel to the end portion 24. An internal angle α of a distal end of each pole tip 40, i.e. an angle formed between an axially-extending end surface of the pole tip 40 and the pole arc surface 36, is a sharp angle which is preferably 90 degrees. Preferably, the extending length of the pole tip 40 is slightly less than a half of a width of the interval between the two connecting aims 32. After the connecting arms are joined, a small slot 42 is formed between distal ends of the pole tips 40 at opposing sides of the two pole shoes 34. The slot 42 has a width d1 far less than the width of the interval between the connecting arms 32, which significantly reduces the cogging torque while avoiding the magnetic leakage, thereby resulting in more smooth rotation of the rotor 16 and reduced noise.

Preferably, a startup groove 44 is formed in the pole arc surface 36. The startup groove 44 is offset from a central axis X (see FIG. 7) of the pole shoe 34 by an angle. In this embodiment, there are two startup grooves 44 disposed in the two pole shoes 34, respectively. One startup groove 44 is disposed adjacent an inner one of the pole tips 40 of its corresponding pole shoe 34, the other startup groove 44 is disposed adjacent an outer one of the pole tips 40 of its corresponding pole shoe 34, and the two startup grooves 44 are spaced 180 degrees in the circumferential direction. The startup grooves 44 are offset from the central axis of the pole shoe 34, such that when the motor is powered off to stop, a pole axis of the rotor 16 is offset from the central axis X of the pole shoe 34 by an angle, i.e. the dead point is avoided, which ensures that the motor 10 can be successfully started when energized again.

Figure 5:
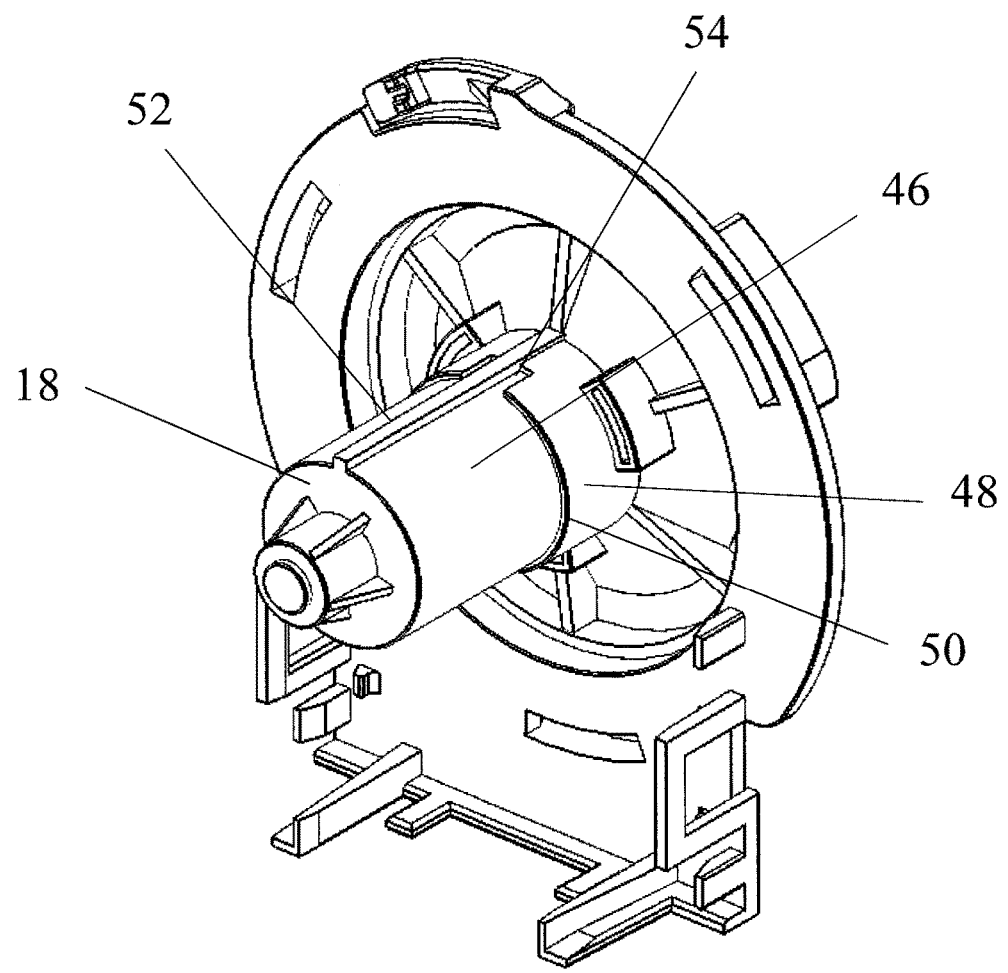
FIG. 5 is a perspective view of a rotor housing of the liquid pump of FIG. 3.

Referring to FIG. 5, the rotor housing 18 has a cylindrical structure with an open end and a closed end, and the rotor 16 is rotatably received in the rotor housing 18. The rotor 16 and the stator 12 are isolated from each other by the base body 18. An outer wall surface of the rotor 16 and the pole arc surfaces of the stator are spaced in the radial direction to define a main air gap therebetween. The main air gap has a width d2. The air gap between the rotor 16 and the stator 12 increases in width at the area of the startup groove 44. Preferably, a ratio of the width d1 of the slot 42 to the width d2 of the main air gap is greater than zero but less than two, i.e. $0<d1/d2<2$, which reduces the cogging torque and hence results in a smooth rotation of the motor and reduced noise. The shaft 17 of the rotor 16 extends out through the open end of the rotor housing 18 to drive the impeller 12 to rotate. In this embodiment, the rotor housing 18 integrally connects to an outer housing 13 of the impeller 12 at the open end of the rotor housing 18. Alternatively, the rotor housing 18 and the outer housing 13 may form a monolithic structure by injection molding.

Figure 6:
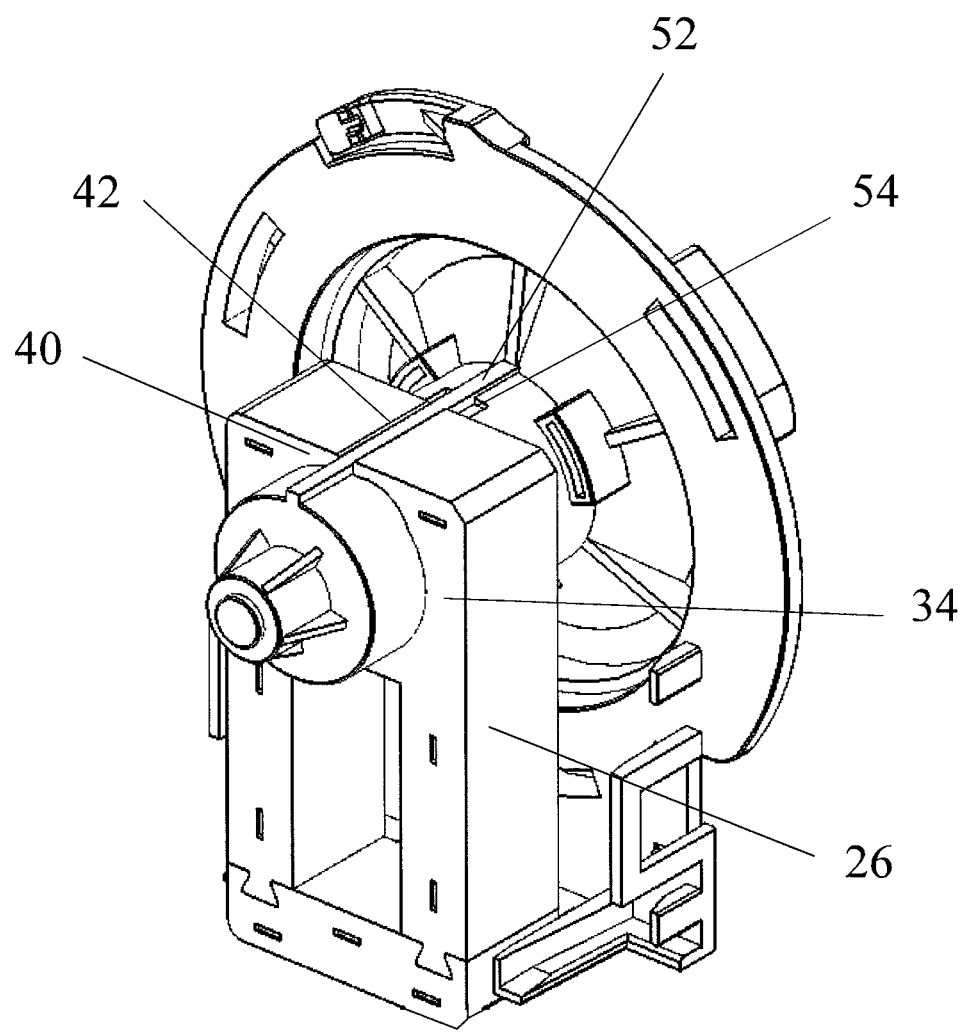
FIG. 6 is an assembled view of the magnetic core of FIG. 4 and the rotor housing of FIG. 5.
Figure 7:
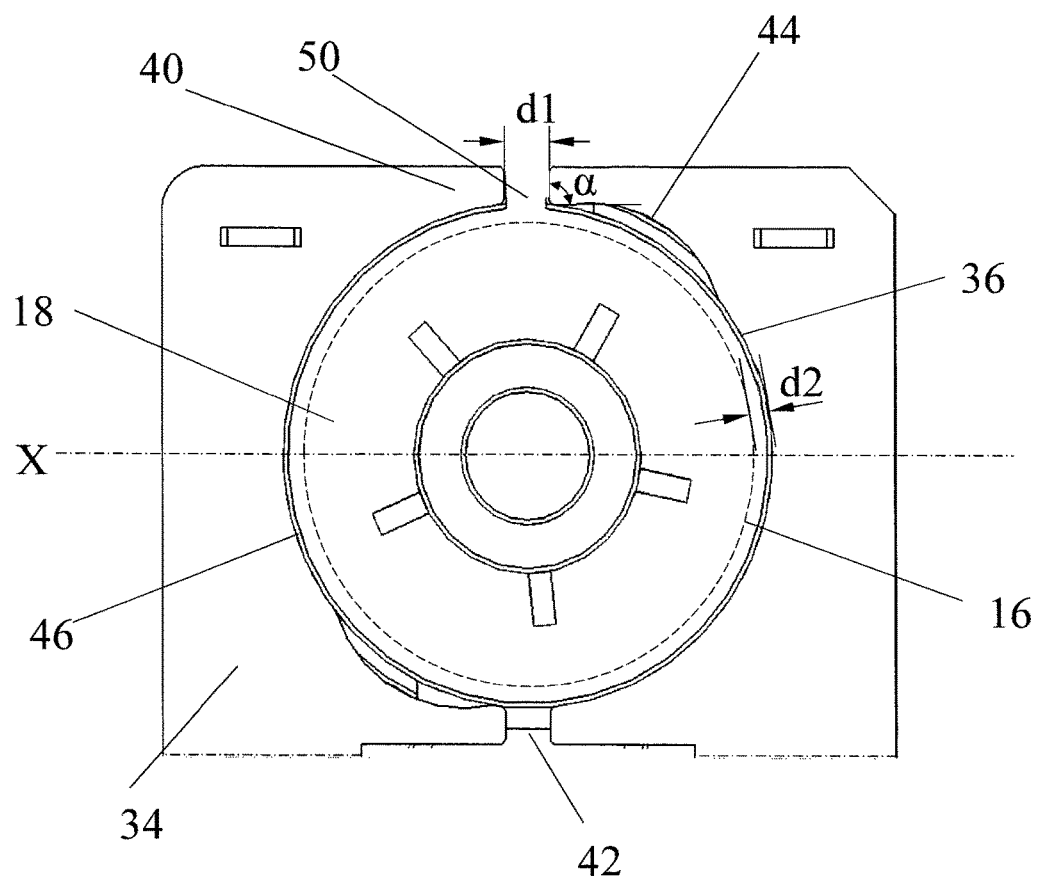
FIG. 7 is a front view of FIG. 6.

Referring also to FIG. 6 and FIG. 7, an outer diameter of the sleeve 18 is substantially equal to a diameter of the pole arc surfaces 36 of the pole shoes 34, i.e. a diameter of the space 38 between the pole shoes 34. After assembly of the magnetic core 20 and the rotor housing 18, substantially no gap exists between the pole arc surfaces 36 of the pole shoes 34 and the outer wall surface 46 of the sleeve 18 except for the areas of the startup grooves 44. A step 48 projects radially outwardly from the outer wall surface 46 of the sleeve 18 at the opening end thereof, i.e. one end of the sleeve 18 adjacent the impeller 12. The step 48 has an outer diameter greater than the remaining part of the outer wall surface 46 of the sleeve 18, i.e. greater than the diameter of the pole arc surfaces 36. In assembly, the closed end of the sleeve 18 is inserted into the space 38 between the two pole shoes 34 of the magnetic core 20 and is moved axially relative to the magnetic core 20 until an axial end surface 50 of the step 48 of the sleeve 18 contacts the magnetic core 20 to be axially positioned.

For facilitating the assembly of the magnetic core 20 and the rotor housing 18, the outer wall surface 46 of the sleeve 18 is formed with a rib 52. The rib 52 is positioned in correspondence with the slot 42 between the pole shoes 34 of the magnetic core 20. The rib 52 has a width substantially equal to or slightly less than the width of the slot 42. In assembly, the rib 52 is aligned with the slot 42 of the magnetic core 20 in the axial direction and inserted into the slot 42 to guide the axial movement of the rotor housing 18 relative to the magnetic core 20. As such, the rotor housing 18 and the stator 14 can be quickly assembled, and the coaxiality of the stator 14 and the rotor 16 can be ensured. Preferably, the rib 52 extends axially from the closed end of the sleeve 18 and reaches at least the axial end surface 50 of the step 48. In this embodiment, the rib 52 extends to reach the open end of the sleeve 18, with the rib 52 crossing the step 48. The step 48 forms recesses 54 at two circumferential sides of the rib 52 for receiving debris formed during assembly of the rotor housing 18 and the magnetic core 20. In this configuration, the axial end surface 50 of the step 48 breaks apart in the circumferential direction.

Preferably, a radial depth of the recess 54 into the step 48 is not less than the radial thickness of the step 48 projecting outwardly. That is, a radial bottom of the recess 54 at least not projects relative to the outer wall surface 46 of the sleeve 18. In this embodiment, the bottom of the recess 54 is coplanar with the outer wall surface 46 of the sleeve 18. The slot 42 of the pole tips 40 of the pole shoes 34 is narrow, and the internal angle of the distal end of the pole tip 40 is a sharp corner. Therefore, in assembly of the magnetic core 20 and the rotor housing 18, scratching can easily occur, which forms debris. In this embodiment, even if the magnetic core 20 scratches the outer wall surface 46 of the sleeve 18, because the axial end surface 50 breaks apart at opposite sides of the rib 52, the debris can slide into the recesses 54 of the step 48 formed at the opposite sides of the rib 52, without being clamped between the step 48 and the pole shoes 34 of the magnetic core 20. As such, this ensures the symmetry of the magnetic core 20, which makes the magnetic core 20 keep coaxial with the rotor 16 and achieves smooth operation of the rotor 16, thus reducing noise as much as possible.

Figure 8:
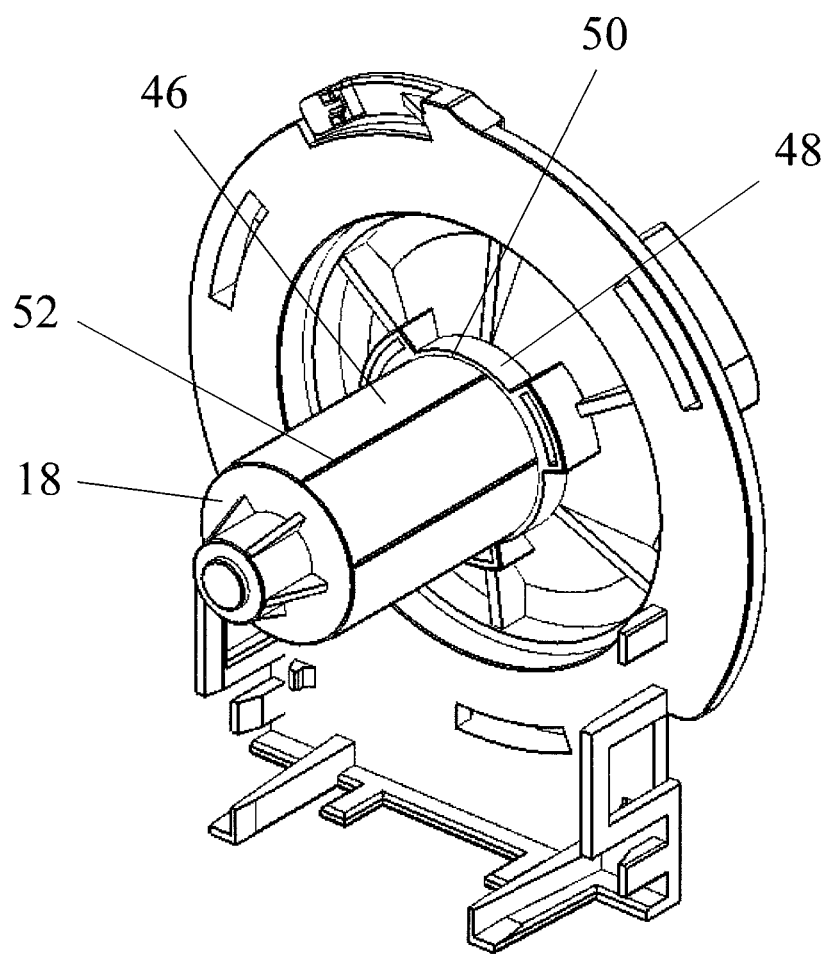
FIG. 8 is a perspective view of the rotor housing of the liquid pump according to another embodiment of the present disclosure.
Figure 9:
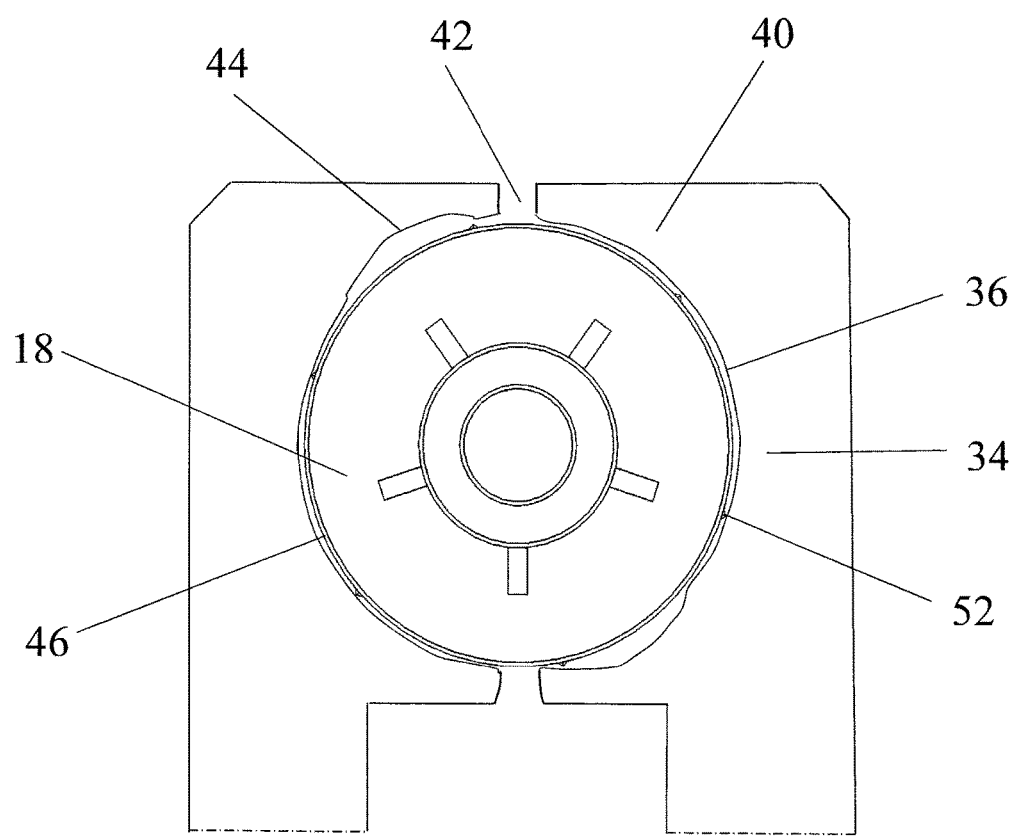
FIG. 9 is an assembled view of the rotor housing of FIG. 8 and the magnetic core.

FIG. 8 illustrates the rotor housing 18 of the motor 10 of the pump according to another embodiment. This embodiment differs from the above embodiment in that, in this embodiment, the outer diameter of the outer wall surface 46 of the sleeve 18 is slightly less than the diameter of the pole arc surfaces 36 of the pole shoes 34. Multiple ribs 52 are formed on the outer wall surface 46 of the sleeve 18, for guiding the rotor housing 18 in assembly with the magnetic core 20. The ribs 52 are evenly spaced along the circumferential direction. Each rib 52 extends axially to the end surface 50 of the step 48. Referring to FIG. 9, in assembly, the sleeve 18 is inserted into the space 38 between the pole shoes 34 and is moved axially. Because the outer diameter of the sleeve 18 is slightly smaller, a small radial gap is formed between the pole arc surfaces 36 of the pole shoes 34 and the outer wall surface 46 of the sleeve 18, and the outer wall surface 46 of the sleeve 18 does not contact the pole shoes 34. The ribs 52 on the outer wall surface 46 of the sleeve 18 contact the pole arc surfaces 36 of the pole shoes 34. However, when compared against the outer wall surface of the sleeve 18, the contact area between the ribs 52 and the pole arc surfaces 36 is almost negligible and, therefore, the scratches caused by the ribs 52 are so limited that nearly no debris is produced. In addition, the gap is formed between the pole arc surfaces 36 of the pole shoes and the outer wall surface 46 of the sleeve 18, which can receive the debris. Likewise, this prevents the debris from being clamped between the step 48 and the pole shoes 34 and hence ensures the symmetry of the magnetic core 20, which makes the magnetic core 20 keep coaxial with the rotor 16 after assembled, achieves smooth operation of the rotor 16, and reduces noise.

Although the present disclosure is described with reference to one or more preferred embodiments, it should be appreciated by those skilled in the art that various modifications are possible. Therefore, the scope of the present disclosure is to be determined by reference to the claims that follow.

The invention claimed is:

1. A motor comprising a stator and a rotor rotatable relative to the stator, wherein the stator comprises a magnetic core and a winding wound around the magnetic core, the magnetic core is mounted to a base body, the base body has at least one recess adjoining the magnetic core for receiving debris produced by mutual friction between the magnetic core and the base body, the base body has a sleeve receiving the rotor, the magnetic core comprises a pair of pole shoes, inner wall surfaces of the pair of pole shoes are recessed to form pole arc surfaces surrounding the sleeve, the pole arc surfaces of the pole shoes lay on an outer wall surface of the sleeve, a slot is defined between pole tips of the pair of pole shoes, and the sleeve has an axially-extending rib which is slidably inserted into the slot between the pole tips of the pole shoes to guide an axial movement of the sleeve relative to the magnetic core, wherein the base body has a step projecting radially outwardly from an outer wall surface of the sleeve with an axial end surface of the step contacting the magnetic core, the at least one recess is defined in the step, and the at least one recess and the magnetic core are disposed at two sides of the axial end surface.

2. The motor of claim 1, wherein the base body is disposed between the stator and the rotor in a radial direction.

3. The motor of claim 1, wherein the rib intersects with the axial end surface of the step of the base body, the number of the recess is two, and two recesses are disposed at two circumferential sides of the rib respectively.

4. The motor of claim 3, wherein the rib extends to the step, and the two recesses are defined by the rib and the step and extend through the axial end surface of the step.

5. The motor of claim 3, wherein the rib extends axially from one end of the sleeve and reaches the opposite end of the sleeve and cross the step.

6. The motor of claim 1, wherein the pole arc surface is formed with a startup groove.

7. The motor of claim 1, wherein an air gap is formed between the outer wall surface of the rotor and the pole arc surfaces of the stator, and a ratio of a width of the slot to a width of the air gap is greater than zero and less than two.

8. The motor of claim 1, wherein an axially-extending end surface of pole tip of each pole shoe and the pole arc surface intersect to form a sharp angle.

9. The motor of claim 8, wherein the axially-extending end surface of the pole tip of each pole shoe and the pole arc surface perpendicularly intersect with each other.

10. The motor of claim 1, wherein the motor is a single phase synchronous motor, and the rotor of the motor is a permanent magnet motor.

11. A pump comprises a motor according to claim 1 and an impeller couple to the rotor of the motor.

\* \* \* \* \*